(12) United States Patent
Binoist et al.

(10) Patent No.: US 6,902,713 B1
(45) Date of Patent: Jun. 7, 2005

(54) METHOD FOR PARTIALLY OXIDIZING A GAS STREAM COMPRISING HYDROGEN SULPHIDE AND AMMONIA

(75) Inventors: Manuel Binoist, Paris (FR); Christel Champinot, Boulogne (FR); Denis Cieutat, Neuilly-sur-Seine (FR); Benoit Grand, Versailles (FR); Richard Soula, Vertou (FR); Rémi Pierre Tsiava, Saint-Germain-les-Corbeil (FR)

(73) Assignee: L'Air Liquide, Société Anonyme à Directoire et Conseil de Surveillance pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 10/399,527

(22) PCT Filed: Oct. 17, 2001

(86) PCT No.: PCT/FR01/03206

§ 371 (c)(1),
(2), (4) Date: Apr. 17, 2003

(87) PCT Pub. No.: WO02/32551

PCT Pub. Date: Apr. 25, 2002

(30) Foreign Application Priority Data

Oct. 17, 2000 (FR) ............................................. 00 13277

(51) Int. Cl.[7] ........................ B01D 53/58; B01D 53/34; B01D 53/52; C01B 17/04

(52) U.S. Cl. ................... 423/237; 423/224; 423/573.1; 423/576.8

(58) Field of Search ............................... 423/224, 237, 423/576.8, 573.1

(56) References Cited

U.S. PATENT DOCUMENTS

| | | | | |
|---|---|---|---|---|
| 4,394,119 A | * | 7/1983 | Waller et al. ................... | 431/5 |
| 4,438,069 A | * | 3/1984 | Peterman et al. .............. | 422/62 |
| 4,543,245 A | * | 9/1985 | Peterman et al. ......... | 423/574.1 |
| 4,569,699 A | * | 2/1986 | Hagans ........................ | 428/472 |
| 4,596,699 A | * | 6/1986 | Desgrandchamps et al. .......................... | 422/160 |
| 5,139,764 A | * | 8/1992 | Szekely .................... | 423/574.1 |
| 5,266,274 A | * | 11/1993 | Taggart et al. .............. | 422/112 |
| 5,904,910 A | * | 5/1999 | Stevens et al. .......... | 423/574.1 |
| 6,083,466 A | * | 7/2000 | Djavdan et al. ............. | 423/210 |
| 6,287,535 B1 | * | 9/2001 | Schendel ................. | 423/573.1 |
| 6,312,651 B1 | * | 11/2001 | Watson et al. ................. | 422/182 |
| 6,328,940 B1 | * | 12/2001 | Djavdan et al. ............. | 423/224 |
| 6,352,680 B1 | * | 3/2002 | Watson et al. ........... | 423/573.1 |
| 6,506,357 B2 | * | 1/2003 | Watson et al. ........... | 423/573.1 |
| 6,638,057 B2 | * | 10/2003 | Watson et al. .............. | 431/174 |

FOREIGN PATENT DOCUMENTS

| | | |
|---|---|---|
| EP | 0 810 974 A1 | 2/1996 |
| EP | 0 974 552 | 6/1999 |
| WO | WO 01/48423 A1 * | 7/2001 |

* cited by examiner

Primary Examiner—Stanley S. Silverman
Assistant Examiner—Ardith E. Hertzog
(74) Attorney, Agent, or Firm—Linda K. Russell (57) ABSTRACT

A method for partially oxidizing, in a Claus furnace, at least one gas containing hydrogen sulfide and ammonia with at least one gas rich in oxygen. The residual ammonia content at the outlet of the furnace is measured with a laser diode. Based upon this measurement, the flow rates of the ammonia containing gases and the oxygen rich gases may be modified to obtain the desired residual ammonia content.

25 Claims, 5 Drawing Sheets

METHOD FOR PARTIALLY OXIDIZING A GAS STREAM COMPRISING HYDROGEN SULPHIDE AND AMMONIA

BACKGROUND

The present invention relates to a process for the partial oxidation, in a Claus furnace, of a gas stream comprising hydrogen sulphide and ammonia by reaction with a stream of a gas rich in oxygen.

Gas streams enriched with hydrogen sulphide are wastes produced by numerous industries, in particular the oil refining industry and the natural gas production industry. For reasons related in particular to the environment, these gases rich in hydrogen sulphide cannot be released as they are into the atmosphere. It is therefore necessary to treat them for the purpose of significantly reducing their hydrogen sulphide content. A well known process for treating these gases rich in hydrogen sulphide is the modified Claus process, commonly referred to as the Claus process. This process comprises a thermal part and a catalytic part. Two main reactions are carried out in the thermal part. The first reaction consists in reacting a portion of the hydrogen sulphide with oxygen in order to produce water and sulphur dioxide in the following way:

$$H_2S + \tfrac{3}{2} O_2 \rightarrow H_2O + SO_2$$

SUMMARY

Approximately ⅓ of the hydrogen sulphide to be treated is oxidized by this first reaction. The remaining ⅔ are reacted with the sulphur dioxide formed during the above first stage, according to the following reaction, referred to as the Claus reaction:

$$2H_2S + SO_2 \leftrightarrow \tfrac{3}{2} S_2 + 2H_2O \quad \text{(ii)}$$

The combustion products are subsequently cooled in a heat recovery boiler and then in a first condenser, in which the elemental sulphur is recovered in the liquid form. The gases are subsequently reheated to a temperature which allows them to be treated on one or more catalytic beds (each of these beds being followed by a condenser). The Claus reaction is continued on the catalytic beds until a degree of conversion of hydrogen sulphide is obtained which is compatible with the standards for discharge of sulphur dioxide originating from the final stage of the process, which is the incineration of the residual $H_2S$. In the case where the two or three catalytic beds do not allow the standards for discharge of sulphur dioxide to be reached, a tail gas treatment unit can be added before sending the waste gases to the final incinerator.

The gas streams rich in hydrogen sulphide treated in a refinery can sometimes comprise ammonia in addition to the hydrogen sulphide. This is the case, for example, with the waste gases resulting from sour water strippers, in which the condensates from processes (for example, hydrocracking or catalytic cracking stage, in particular for heavy feedstocks) are stripped with steam in order to recover the hydrogen sulphide and the ammonia. These gases are typically composed of a third of hydrogen sulphide, of a third of ammonia and of a third of steam.

During the treatment of these gas streams according to the Claus process, the destruction of the ammonia has to be as complete as possible therein or else severe operational problems will arise in the Claus unit. This is because, downstream of the heat recovery boiler, deposits of ammonia-comprising salts in the cold lines or at the outlet of the condensers can result in blockages, a deterioration in the performance of the unit and, finally, an increase in the emissions of sulphur dioxide. During the implementation of the Claus process, destruction of the ammonia can be obtained by various chemical reactions (oxidation, thermal dissociation) which take place simultaneously with the first reaction (i) of the Claus process.

It is recognized that the destruction of the ammonia present in the gases comprising hydrogen sulphide is promoted by a high temperature. This destruction can be carried out with Claus oxidation processes employing only air or processes employing both air and oxygen.

In the oxidation processes employing only air, the treatment of the gases comprising hydrogen sulphide and ammonia can take place:

either by use of a two-zone furnace with bypass of a portion or of all the gases not comprising ammonia. This solution makes it possible to increase the temperature of the first zone in which all the gas comprising ammonia is oxidized. Its disadvantage is that it can result in poor destruction of the contaminants of the hydrocarbon or amine type present in the gas not comprising ammonia and can create other problems than the deposition of ammonia-comprising salts (for example: coking of the downstream catalysts), or by use of the refinery fuel gas for increasing the temperature in the reaction furnace. The main disadvantage of this implementation is the increase in the amount of gas passing through the unit, it being possible for this to result in a bottleneck. Furthermore, the introduction of refinery fuel gas into the Claus furnace has a tendency to increase the contents of $CS_2$ and of COS, in the case where the fuel gas comprises a great deal of $CO_2$, in the gases resulting from the Claus furnace, which results in a decline in the performances of the catalytic beds downstream of the furnace.

In the oxidation processes employing both air and oxygen, that is to say where the combustion air is replaced by a mixture of air and of oxygen, it is possible to obtain better treatment of the gases comprising hydrogen sulphide and ammonia as the enrichment of the combustion air with oxygen increases the temperature in the reaction furnace and thus improves the destruction of the ammonium. However, in this case, not only is the temperature of the gases comprising ammonia increased but also that of the gases not comprising ammonia; the amount of oxygen used is therefore not optimized. In addition, the metallurgical characteristics of the air introduction line and of the burner, in combination with the potential presence of grease and of dust in the air introduced, are generally not compatible with degrees of enrichment in oxygen of greater than 28%.

In order to solve the problem of the use of oxygen specifically for increasing the temperature of the gas comprising ammonia, specific burners have been provided making possible separate feeding:

of air, of pure oxygen or of air enriched in oxygen, of gases comprising ammonia, of gases not comprising ammonia.

By the use of these specific Claus burners, which make possible separate confinement of the streams of the various gases, it has been possible to obtain, within the flame, regions of greater or lesser heat. This allows localized rises in temperature dedicated to destroying the ammonia and makes it possible to simultaneously obtain a "colder" temperature for the oxidation of other gases and in contact with the refractory materials of the furnace. This type of burner is disclosed, for example, in Applications EP-A1-0 810 974 and EP-A1-0 974 552. These burners make it possible to destroy the ammonia in so far as the amount of oxygen injected is sufficient.

Whatever the method of injection of the oxygen into the Claus furnace, the amount of oxygen to be injected is generally indexed in terms of composition and of flow rate with respect to a reference ammonia-comprising gas. In point of fact, depending on the operating conditions of the refining units situated upstream of the Claus unit (type of feedstocks and severity of the hydrocracker or of the catalytic cracking unit, for example), the content of ammonia in the gases to be treated can vary enormously, temporarily or otherwise, with respect to the content in the reference ammonia-comprising gas. For example, for a refining set comprising a hydrocracker, the content of ammonia in the gas to be treated can vary between 15 and 35% depending upon whether this hydrocracker is operating or not. The amount of oxygen to be injected to completely destroy the ammonia is then different. Furthermore, if the process provides for the simultaneous treatment of a gas comprising hydrogen sulphide and not ammonia, known as sour gas, and if this gas varies in amount or in quality (content of hydrogen sulphide or content of hydrocarbons, for example), the operating conditions in the furnace of the Claus unit must be modified and influence the amount of oxygen necessary to completely destroy the ammonia.

SUMMARY

One aim of the present invention is to provide an oxidation process in a Claus furnace which makes possible complete destruction of the ammonia.

Another aim is to provide an oxidation process in a Claus furnace which makes possible complete destruction of the ammonia with optimization of the consumption of oxygen, whatever the amount and whatever the quality of the sulphur gases comprising ammonia.

Another aim is to provide an oxidation process in a Claus furnace which makes possible the complete destruction of the ammonia with optimization of the consumption of oxygen, whatever the amounts and whatever the qualities of the sulphur gases comprising ammonia or of the sulphur gases not comprising ammonia.

The process according to the invention exhibits the advantage of being able to be employed on existing units without significant modification of the Claus plant.

With these aims, the invention relates to a process for the partial oxidation, in a Claus furnace, of at least one gas stream comprising hydrogen sulphide and ammonia, known as ammonia-comprising gas, using a gas stream rich in oxygen, in which:
the residual ammonia content at the outlet of the Claus furnace is measured,
this value is compared with the desired residual ammonia content,
and, optionally, the ratio of the flow rate of the gas rich in oxygen to the flow rate of the ammonia-comprising gas is modified, so as to obtain the desired residual ammonia content.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

According to the essential characteristic of the invention, the residual ammonia content is measured downstream of the Claus furnace, this value is compared with the desired residual ammonia content and, optionally, the ratio of the flow rate of the gas rich in oxygen to the flow rate of the ammonia-comprising gas is modified, so as to obtain the desired residual ammonia content. The residual ammonia content desired downstream of the furnace is set by the user of the Claus unit and generally corresponds to the maximum value allowable for the satisfactory operation of the Claus process, usually less than 150 ppmv. If the value of the residual ammonia content at the outlet of the Claus furnace is greater than the desired residual ammonia content, the ratio of the flow rate of the gas rich in oxygen to the flow rate of the ammonia-comprising gas is increased. Thus, this process ensures destruction of the ammonia down to the desired contents. This process also makes possible optimized consumption of the gas rich in oxygen. This is because the monitoring of the residual ammonia content at the outlet of the Claus furnace also makes it possible to modify the ratio of the flow rate of the gas rich in oxygen to the flow rate of the ammonia-comprising gas, so as to obtain the desired residual ammonia content for a minimum flow rate of gas rich in oxygen. Thus, if it is found that the residual ammonia content at the outlet of the furnace is always less than the value of the desired residual ammonia content, the consumption of gas rich in oxygen can be reduced.

The measurement of the residual ammonia content at the outlet of the Claus furnace is made by analysis of the gases exiting from the furnace. This measurement can be made:
in the gases directly resulting from the furnace,
in the gases directly resulting from the heat recovery boiler placed at the outlet of the furnace,
in the gases directly resulting from the sulphur condensers placed at the outlet of the furnace.

The residual ammonia content is preferably measured continuously.

According to the preferred form of the invention, the residual ammonia content at the outlet of the Claus furnace is measured with a laser diode. The principle of the laser diode consists in measuring the absorption of a portion of the laser radiation emitted at an appropriate wavelength by the gas for which it is desired to measure the concentration. In the present invention, the term "laser diode" is understood to mean the measuring device which is composed of the emitter of the laser radiation and of the receiver of the radiation after it has passed through the medium to be analyzed and of an electronic unit which compares the emitted radiation and the received radiation. In the context of the present invention, the laser diode is adjusted in order to measure the absorption of the 1 500 nm wavelength corresponding to the presence of ammonia in the medium traversed by the laser radiation. Any type of laser diode which makes it possible to measure the absorption of the 1500 nm wavelength can be used in the context of the present invention. Depending upon the location of the laser diode in the Claus unit, a laser diode is used which makes it possible to measure the concentration in gas exhibiting a temperature of greater than 100° C.

The laser diode can be installed in the Claus unit according to various alternative forms. According to a first alternative form, the laser diode is placed on the main pipe of the process downstream of the Claus furnace. Thus, the optical path followed by the laser radiation traverses the main pipe of the process. According to this alternative form, the wall of the pipe is pierced by two opposing observation windows. The laser emitter and receiver can be positioned behind each of these observation windows, or the emitter and receiver can be placed behind the same observation window and a mirror is then placed behind the second observation window, so as to reflect the laser beam emitted by the emitter to the receiver. A gas, for example nitrogen, can be used to clean the surface of the observation windows of the emitter and the receiver of the laser diode in order to avoid deposition of sulphur vapour and also in order to prevent overheating of the emitter and receiver.

According to a second alternative form, the laser diode is placed on a pipe for withdrawal of gas from the process downstream of the Claus furnace. Thus, the optical path followed by the laser radiation traverses a subsidiary gas withdrawal pipe placed as a bypass on the main pipe of the process. The laser diode can then be employed in the same way as on the main pipe through two observation windows pierced in the wall of the subsidiary pipe. The measurement can be made by virtue of a measurement cell in which the subsidiary pipe emerges. If the subsidiary pipe exhibits a rectilinear portion, it is also possible to place the emitter and the receiver of the laser diode at each end of this rectilinear portion. It is generally preferable for the subsidiary pipe to be heated over its entire length to a temperature greater than the temperature of the dew point of the sulphur vapour, in order to avoid sulphur deposits on the walls of the measurement cell. In the case where a purge of the emitter and/of the receiver of the laser diode is installed, this purge must be quantified so as to avoid excessively high dilution of the gas analysed by the purge gas. After analysis by the laser diode, the gases in the subsidiary withdrawal pipe can be reinjected into the main pipe of the process or discharged to the atmosphere. In the case where the gases are reinjected, a gas ejecter (for example, nitrogen or steam) can be placed downstream of the measurement cell in order to facilitate the flow of the gases in the subsidiary withdrawal pipe. When the gases are discharged to the atmosphere, the toxic compounds which are present therein are preferably removed beforehand by a physical treatment module (adsorbent bed) or chemical treatment module (liquid reaction vessels) placed at the end of the subsidiary withdrawal pipe.

A cartridge filled with glass wool can be placed across the pipe in the subsidiary pipe upstream of the laser diode, in order to trap the sulphur vapours. This cartridge can make it possible to dispense with the purges at the emitters and receivers of the laser diode. In order to guarantee continuous operation, two cartridges can be placed in parallel.

Depending upon the value of the residual ammonia content in the gases at the outlet of the Claus furnace, the ratio of the flow rate of the gas rich in oxygen to the flow rate of the ammonia-comprising gas can be modified manually, in particular when there are significant and lasting modifications in the amounts and/or qualities of the ammonia-comprising gas treated in the unit. However, this modification is sooner carried out automatically. Thus, the ratio of the flow rate of the gas rich in oxygen to the flow rate of the ammonia-comprising gas is generally modified by a regulation loop placed between the device for measuring the residual ammonia content and a controller which directs the regulator for the flow rate of the gas rich in oxygen. The controller is governed by a calculator which receives the measurement of the residual ammonia content, compares it with the desired value and optionally modifies the ratio of the flow rates by opening or closing the valve directed by the flow-rate regulator. The calculator is also generally connected to:

a device for measurement of the flow rate of the ammonia-comprising gas entering the furnace, instructions to be observed regarding the range of values of the ratio of flow rates of the gases: flow rate of the gas rich in oxygen/flow rate of the ammonia-comprising gas.

According to a preferred form, the stream of gas rich in oxygen can be connected to two sources of gas rich in oxygen: a primary source and a secondary source. The flow rate of the stream of gas rich in oxygen is then controlled by the feeding of gas provided by these two sources. The flow rate of gas rich in oxygen resulting from the primary source is preferably controlled by the calculator as a function of the signal which it receives from the measurement of the flow rate of the ammonia-comprising gas entering the furnace (feedforward signal (FF)), whereas the flow rate of gas rich in oxygen resulting from the secondary source is preferably controlled by the calculator as a function of the signal which it receives from the measurement of the residual ammonia content at the outlet of the furnace (feedback signal (FB)). The secondary source thus makes it possible to respond to the fluctuations in flow rate and in concentration of ammonia in the ammonia-comprising gas.

The process according to the invention applies to any type of ammonia-comprising gas. The concentration of hydrogen sulphide in the stream of ammonia-comprising gas is generally between 10 and 90 molar %; the concentration of ammonia in this gas stream is itself generally at least 5 molar %, preferably between 10 and 60 molar %. This gas can also comprise 10 to 60 molar % of steam.

In the process according to the invention, the gas rich in oxygen can be air or air enriched in oxygen, preferably enriched in a content of greater than 25 molar %, or preferably still in a content of between 40 and 100 molar %, the gas enriched to 100% in oxygen corresponding to pure oxygen. The content of oxygen in which the said gas is enriched in oxygen corresponds to the molar fraction of oxygen in the said enriched gas. By way of example, air enriched in oxygen to 50% consists of a gas mixture comprising 50 molar % of oxygen.

A second gas comprising oxygen, known as gas less rich in oxygen, which exhibits a content of oxygen lower than that of the gas rich in oxygen described above, can also be introduced into the Claus furnace. The gas less rich in oxygen is generally air.

According to the process of the invention, a gas stream comprising hydrogen sulphide and not ammonia, known as sour gas, can also be injected into the furnace. The term "gas not comprising ammonia" is understood to mean a gas with a molar concentration of ammonia of less than 5% (<5%).

The concentration of hydrogen sulphide in this gas stream can itself be at least 10 molar %, more generally between 60 and 95 molar %. The sour gas stream is essentially composed of hydrogen sulphide and can also comprise at least one of the following compounds: steam, carbon dioxide, hydrocarbons and other sulphur compounds.

According to a first alternative embodiment of the invention, the gases can be mixed before being injected into the Claus furnace. Thus, the ammonia comprising gas and the sour gas can be mixed and then injected into the Claus furnace via the same pipe. Likewise, the gas rich in oxygen and the gas less rich in oxygen are generally mixed beforehand in the same pipe upstream of the burner and then injected, mixed, into the Claus furnace. This implementation is commonly referred to as enriching by premixing (or premix).

According to a second alternative embodiment of the invention, the gases are injected into the Claus furnace via separate pipes. According to this second alternative form, the velocity vectors for injection into the furnace of the various gases are generally substantially parallel, which means, in the context of the present invention, that the angle formed by the velocity vectors of each of the gases, taken immediately on emerging from the burners, is less than approximately 15°. According to this second alternative form of the process of the invention, the stream of the gas rich in oxygen can be surrounded by a stream of gas less rich in oxygen. These two streams are preferably as follows: the gas very rich in oxygen is pure oxygen and the gas less rich in oxygen is air. According to this second alternative form, the stream of ammonia-comprising gas and the stream of gas rich in oxygen are usually injected into the furnace so that the said streams come into contact and allow the partial oxidation reaction of the hydrogen sulphide with the oxygen and reactions of oxidation and of thermal dissociation of the ammonia. To this end, the said streams are injected close to one another and preferably in such a way that the stream of gas rich in oxygen surrounds the stream of ammonia-comprising gas. In a particularly preferred way, at least a portion of the stream of ammonia-comprising gas is surrounded by at least a portion of the stream of gas rich in oxygen. When a stream of sour gas is injected into the furnace, it is then preferable for this stream to surround the stream or streams of gas comprising oxygen. According to this second alternative form, the various streams injected can be coaxial; thus, these streams can be injected by means of a burner comprising concentric tubes. The injection of these various streams can be carried out by means of a multitube burner, where a central tube makes possible injection of the ammonia-comprising gas, the first intermediate tube surrounding the central tube makes possible the injection of a stream of gas rich in oxygen, the second intermediate tube surrounding the first intermediate tube makes possible the injection of the stream of gas less rich in oxygen and the outer tube makes possible the injection of a stream of sour gas.

The process according to the invention is generally carried out in the conventional Claus furnace.

If the process provides for the injection of an ammonia-comprising gas, of a sour gas and of two gas streams comprising oxygen in different contents of oxygen, then the use of two sources (primary and secondary) for each of the two streams of gas rich in oxygen can be applied. In this case, the process is carried out in the following way:

the flow rate of gas rich in oxygen resulting from the primary source is controlled by the calculator as a function of the signal which the said calculator receives of the measurement of the flow rate of the ammonia-comprising gas entering the furnace (feedforward signal (FF)) and the flow rate of gas rich in oxygen resulting from the secondary source is controlled by the calculator as a function of the signal which the latter receives of the measurement of the residual ammonia content at the outlet of the furnace (feedback signal (FB)), as defined above.

the flow rate of gas less rich in oxygen resulting from the primary source is controlled by the calculator as a function of a signal which the said calculator receives at the measurement of the flow rate of the sour gas entering the furnace (feedforward signal (FF)) and the flow rate of gas less rich in oxygen resulting from the secondary source is controlled by the calculator as a function of the signal which the latter receives from the measurement of the $H_2S/SO_2$ molar ratio made on the tail gas, that is to say before the incinerator of the Claus unit (feedback signal (FB)). An inline gas chromatograph or an ultraviolet spectrometer can, for example, be employed for the analysis of the tail gas.

Figure 1:
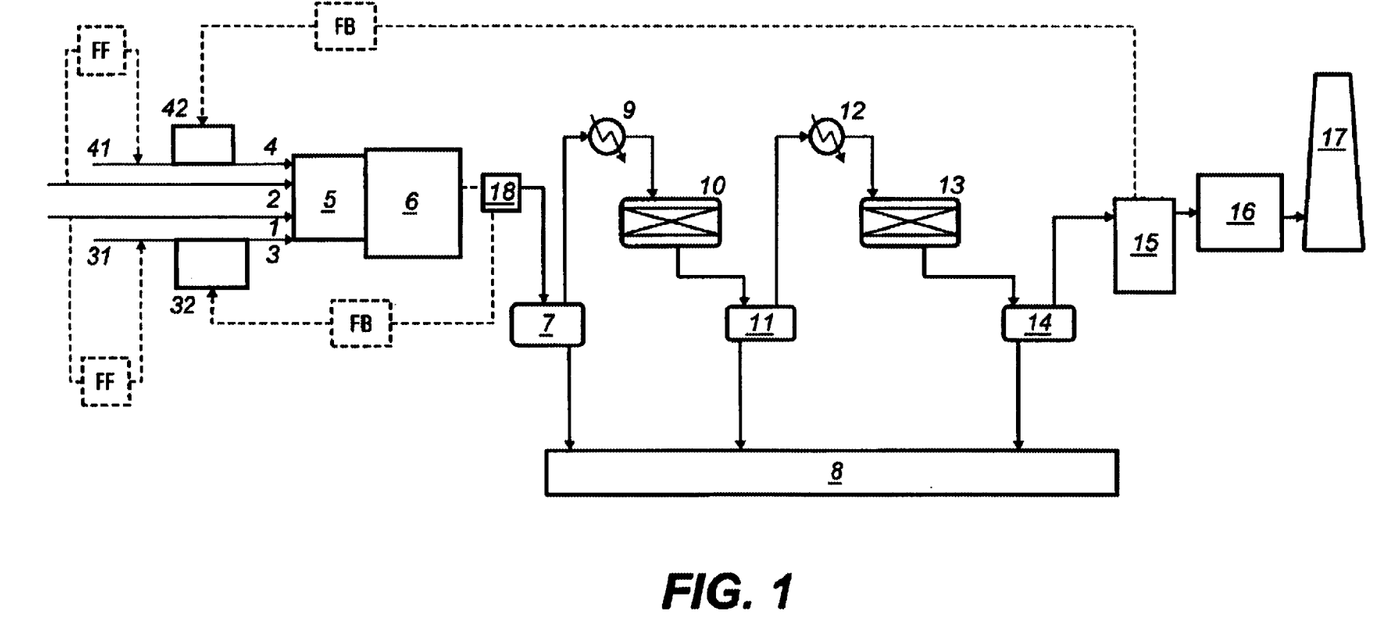
FIG. 1 illustrates a general view of an embodiment, according to the invention, of the partial oxidation process.

FIG. 1 illustrates the process according to the invention in the case where the discharge standards for sulphur dioxide can be satisfied without the addition of a tail gas treatment unit.

The gas comprising hydrogen sulphide and ammonia (1) and the gas comprising hydrogen sulphide and not ammonia (2) are introduced into the furnace (5) with a gas highly rich in oxygen (3) and a gas less rich in oxygen (4).

At the outlet of the furnace (5), the gases pass into a boiler (6) and then into a sulphur condenser (7). The sulphur produced in the condenser (7) is recovered in a sulphur pit (8), while the residues of the gases are reheated (9) and introduced into a catalytic bed (10) for the implementation of the reaction (ii). At the outlet of the catalytic bed (10), the gases are introduced into a condenser (11). The sulphur produced in the condenser (11) is recovered in the sulphur pit (8), while the residues of the gases are reheated (12) and introduced into a second catalytic bed (13) for the implementation of the reaction (ii). At the outlet of the catalytic bed (13), the gases are introduced into a condenser (14). The sulphur produced in the condenser (14) is recovered in the sulphur pit (8). The contents of hydrogen sulphide and sulphur dioxide in the gases resulting from the final condenser (14) are determined in a tail gas analyser (15). These gases subsequently pass into an incinerator (16) and are finally discharged to the atmosphere via the chimney (17).

An analyser of the concentration of ammonia (18) is placed at the outlet of the boiler (6).

The gas rich in oxygen (3) originates from two sources: a primary source (31) and a secondary source (32). The flow rate of the gas rich in oxygen resulting from the primary source (31) is controlled by a flow regulator as a function of the measurement of the flow rate of the gas comprising hydrogen sulphide and ammonia (1) entering the furnace (5) (FF signal). The flow rate of the gas highly rich in oxygen resulting from the secondary source (32) is controlled by a flow regulator as a function of the measurement of the residual ammonia content made by the analyser (18) downstream of the furnace (5) (FB signal).

The gas less rich in oxygen (4) originates from two sources: a primary source (41) and a secondary source (42). The flow rate of the gas less rich in oxygen resulting from the primary source (41) is controlled by a flow regulator as a function of the measurement of the flow rate of the gas comprising hydrogen sulphide and not ammonia (2) entering the furnace (5) (FF signal). The flow rate of the gas less rich in oxygen resulting from the secondary source (42) is controlled by a flow regulator as a function of the measurement of the $H_2S/SO_2$ molar ratio made by the analyser (15) in the tail gas (FB signal).

Figure 2:
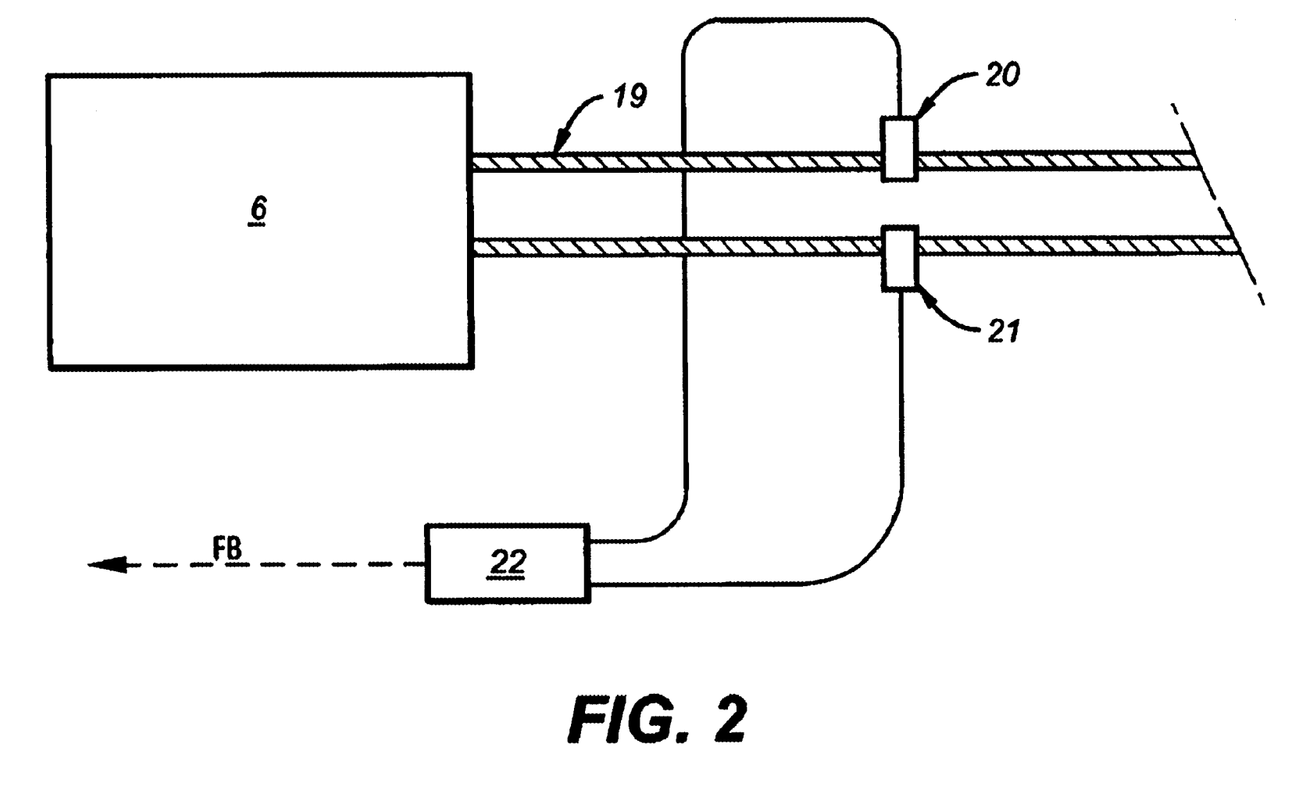
FIG. 2 illustrates a second embodiment, according to the invention, of the partial oxidation process.

FIG. 2 corresponds to the implementation of the first alternative form of the process with a laser diode for measuring the concentration of ammonia. The laser diode is placed on the main pipe (19) of the process downstream of the boiler (6). The optical pathway followed by the laser radiation traverses the main pipe of the process as the emitter (20) and the receiver (21) of the laser diode are positioned facing each other on each side of the pipe behind the observation windows. The emitter (20) and the receiver (21) are connected to an electronic unit (22) which conveys an upstream control signal (FB).

Figure 3:
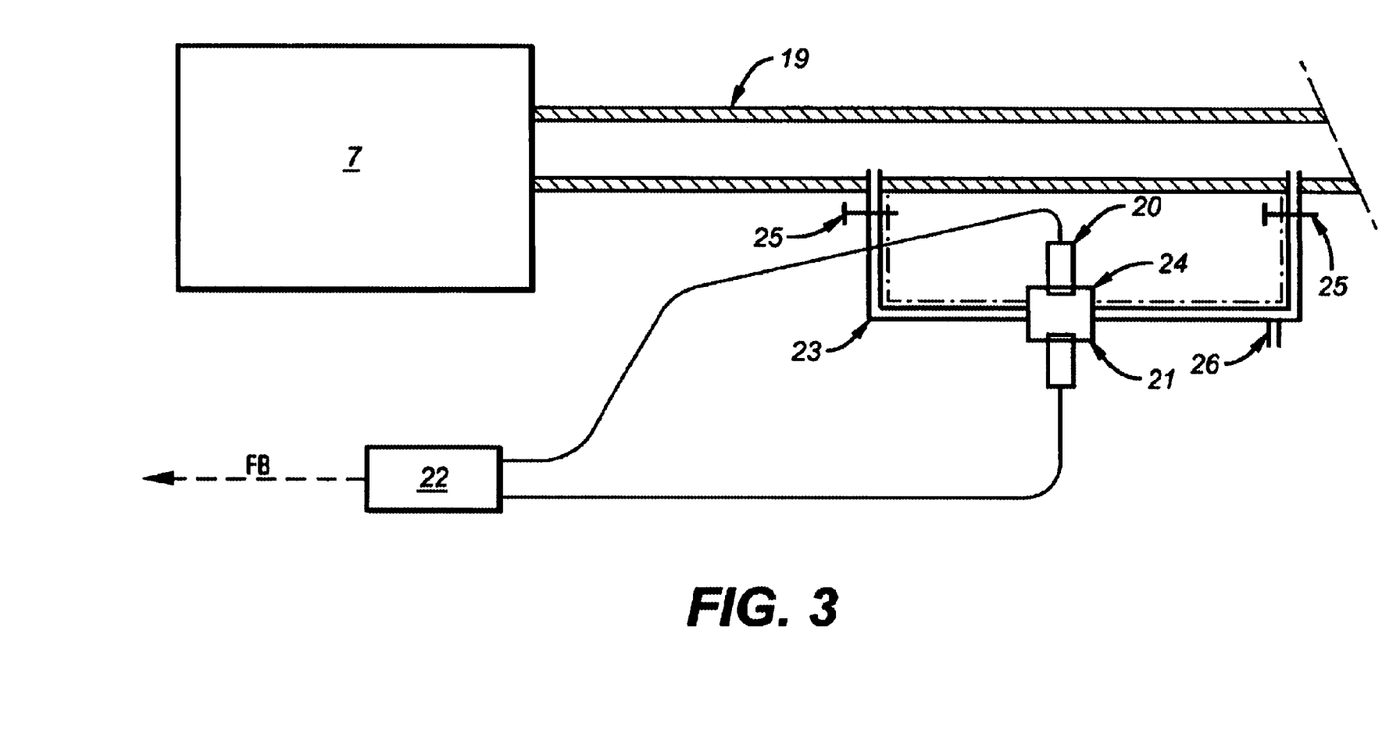
FIG. 3 illustrates a third embodiment, according to the invention, of the partial oxidation process.

FIG. 3 corresponds to an implementation of the second alternative form of the process with a laser diode for measuring the concentration of ammonia. A subsidiary pipe (23) is placed as a bypass on the main pipe (19) downstream of the condenser (7). This subsidiary pipe traverses a measurement cell (24), one side of which comprises the emitter (20) of the laser diode and the other side of which comprises the receiver (21), which are connected to an electronic unit (22) which conveys an upstream control signal (FB). The subsidiary pipe (23) is heated over its entire length. This pipe (23) can optionally be isolated by valves (25), for example for cleaning or replacing the measurement cell. An opening (26) for the injection of an inert gas or steam is provided on the subsidiary pipe (23) after the measurement cell (24).

Figure 4:
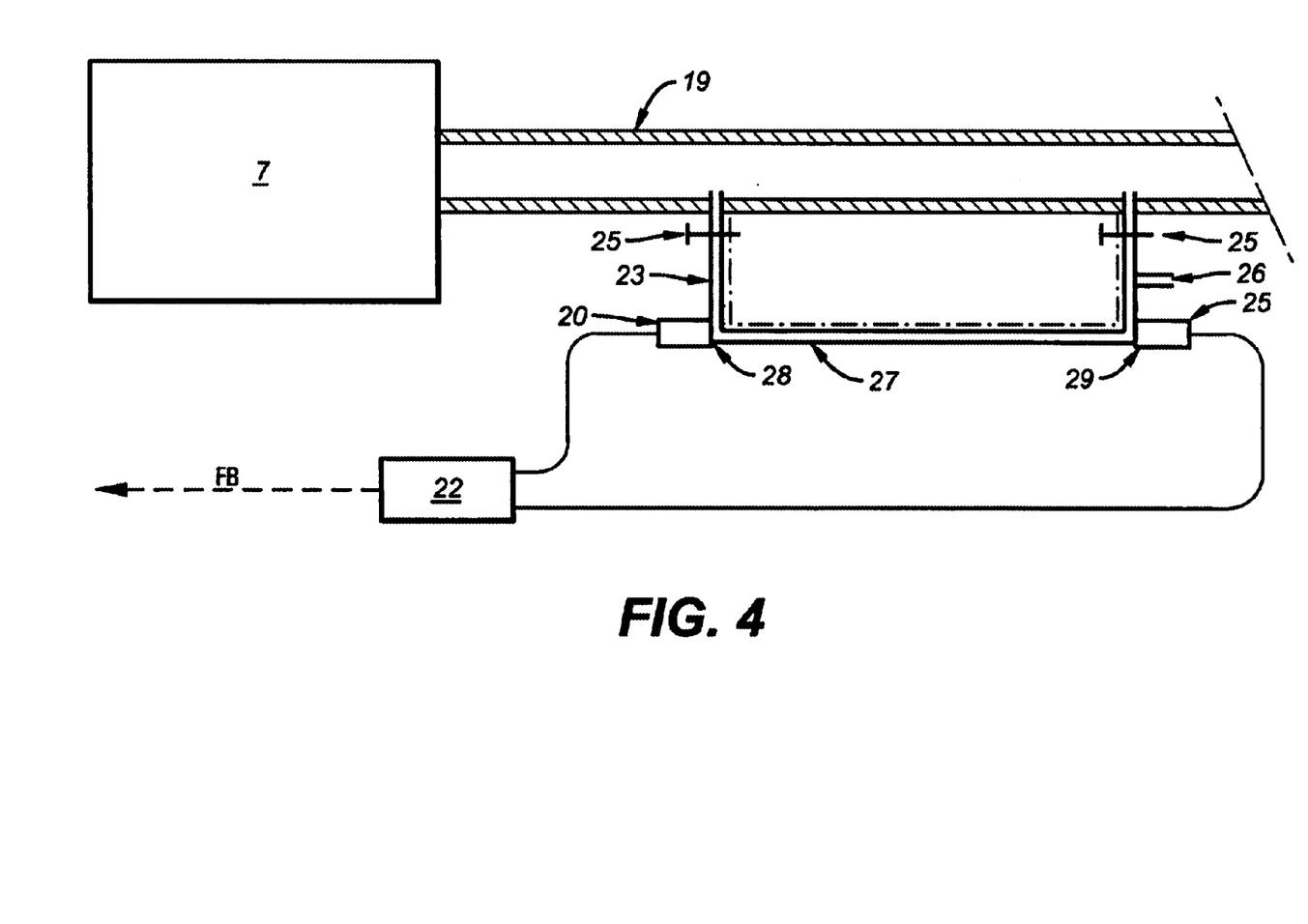
FIG. 4 illustrates a fourth embodiment, according to the invention, of the partial oxidation process.

FIG. 4 corresponds to an implementation of the second alternative form of the process with a laser diode for measuring the concentration of ammonia placed on a subsidiary pipe (23) placed as a bypass on the main pipe (19) downstream of the condenser (7). The subsidiary pipe (23) exhibits a rectilinear portion (27) exhibiting an upstream end (28) and a downstream end (29). The emitter (20) of the laser diode is placed at the upstream end (28) and the receiver of the laser diode (21) is placed at the downstream end (29). The emitter (20) and the receiver (21) are connected to an electronic unit (22) which conveys an upstream control signal (FB). The subsidiary pipe (23) is heated over its entire length. This pipe (23) can optionally be isolated by valves (25), for example for cleaning or replacing the measurement cell. An opening (26) for the injection of an inert gas or of steam is provided on the subsidiary pipe (23) after the measurement cell (24).

Figure 5:
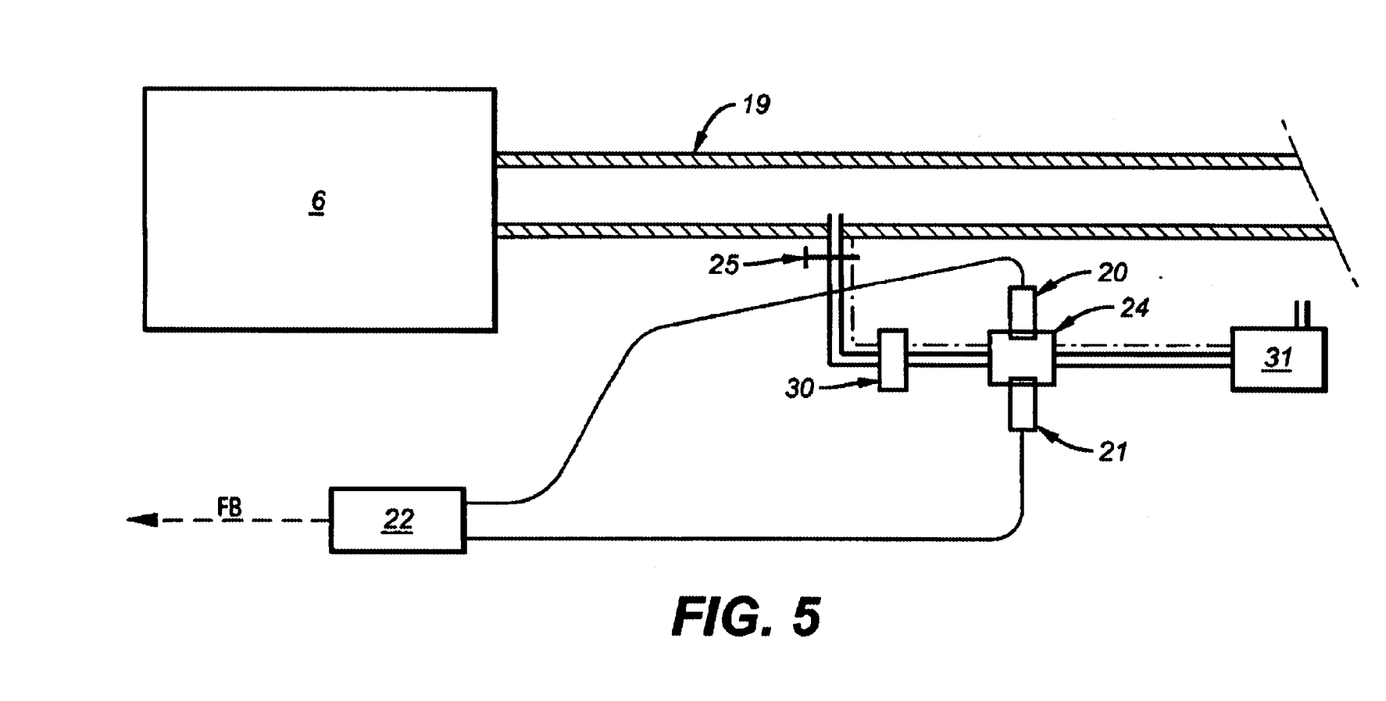
FIG. 5 illustrates a firth embodiment, according to the invention, of the partial oxidation process.

FIG. 5 corresponds to an implementation of the second alternative form of the process with a laser diode for measuring the concentration of ammonia. The subsidiary pipe (23) is placed as a bypass on the main pipe (19) downstream of the boiler (6). This subsidiary pipe traverses a sulphur trap (30) and then a measurement cell (24), one side of which comprises the emitter (20) of the laser diode and the other side of which comprises the receiver (21), which are connected to an electronic unit (22) which conveys an upstream control signal (FB). The subsidiary pipe (23) is heated over its entire length. This pipe (23) can optionally be isolated by a valve (25), for example for cleaning or replacing the measurement cell. After the measurement cell, a module for treatment (31) of the withdrawn gases is placed at the end of the pipe (23) open to the atmosphere.

EXAMPLES

The examples relate to a Claus unit which treats 60 t/day of an ammonia-comprising gas and 100 t/d of a sour gas. The unit is composed:

- of a Claus furnace equipped with a multitube burner which makes possible separate injection of pure oxygen and of air,
- of a heat recovery boiler,
- of a first sulphur condenser,
- of two stages, each composed of an indirect reheater, of a catalytic bed and of a condenser,
- of a tail gas analyser,
- of an incinerator,
- of a chimney.

The unit is adjusted for the treatment of a reference ammonia-comprising gas. The amounts of pure oxygen and of combustion air to be injected for the treatment of this reference gas are calculated in order to have a temperature in the combustion chamber of greater than 1 350° C., corresponding to the criterion for complete destruction of the ammonia selected for the design basis case of the burner.

The normal operating characteristics of the unit are as follows:

TABLE 1

| | | Sour gas | Ammonia-comprising gas | Pure oxygen | Air |
|---|---|---|---|---|---|
| Molar composition | $H_2S$ | 80% | 45% | | |
| | $NH_3$ | 0 | 20% | | |
| | $H_2O$ | 4% | 35% | | |
| | $CO_2$ | 15% | 0 | | |
| | hydrocarbons | 1% | 0 | | |
| Flow rate | | 100 t/d | 60 t/d | 23 t/d | 176 t/d |

The temperature measured within the furnace is 1 354° C. and the $H_2S/SO_2$ molar ratio at the tail gas analyser is 2. The ammonia is completely removed.

Example 1

Temporary Modification in the Content of Ammonia in the Ammonia-Comprising Gas 1.1. Result According to the Prior Art An ammonia-comprising gas exhibiting a higher concentration of ammonia than that of the reference gas is injected into the preceding Claus unit. Its molar composition is as follows:

$H_2S$:40%
$NH_3$:25%
$H_2O$:35%

The flow rates of the sour gas, of the ammonia-comprising gas and of the pure oxygen remain identical to those in the reference case. In order to retain an $H_2S/SO_2$ ratio at the tail gas analyser of 2, the air flow rate is increased to 180 t/day. The temperature measured within the furnace is 1 373° C., ensuring complete destruction of the ammonia.

1.2. Result According to the Invention

A laser diode is placed on a subsidiary withdrawal pipe downstream of the Claus furnace of the preceding unit. This diode continuously measures the concentration of ammonia in the gas exiting from the Claus furnace. This diode is connected to a calculator of the unit, which consequently regulates the amount of oxygen to be injected. The ammonia-comprising gas exhibiting a higher concentration of ammonia than that of the reference gas is injected into the preceding Claus unit.

The flow rates of the sour gas and of the ammonia-comprising gas remain identical to those in the reference case.

As a result of the measurements from the laser diode and from the tail gas analyser, the calculator respectively regulates the flow rates of pure oxygen and of air at 19 and 192 t/day.

The temperature measured within the furnace is 1 335° C. and the $H_2S/SO_2$ molar ratio at the tail gas analyser is 2. The ammonia is completely removed.

Consequently, the implementation of the process according to the invention makes possible complete removal of the ammonia and simultaneously control of the consumption of pure oxygen, since the latter is reduced by 17% between the case 1.1. and the case 1.2.

The invention has made it possible to completely remove the ammonia from a hot zone of the flame using an optimized amount of oxygen. This optimization of the amount of oxygen injected results in an overall temperature of the gases in the combustion chamber which is lower than the design temperature selected.

Example 2

Temporary Modification in the Sour Gas Flow Rate 2.1. Result According to the Prior Art In the reference Claus unit, the sour gas flow rate changes temporarily from 100 t/day to 83 t/day. All the other operating conditions remain identical to the reference case, except for the air flow rate, which changes to 147 t/day by maintenance of the $H_2S/SO_2$ ratio in the tail gas at 2.

The temperature measured within the furnace is 1 383° C., which ensures complete destruction of the ammonia, and the $H_2S/SO_2$ molar ratio at the tail gas analyser is 2.

2.2. Result According to the Invention

A laser diode is placed on a subsidiary withdrawal pipe downstream of the Claus furnace. This diode continuously measures the concentration of ammonia in the gas exiting from the Claus furnace. This diode is connected to a calculator of the unit, which consequently regulates the amount of oxygen to be injected. A sour gas exhibiting a flow rate of 83 t/day is injected into the preceding Claus unit.

As a result of the measurement from the laser diode and from the tail gas analyser, the calculator respectively regulates the flow rates of pure oxygen and of air at 19 and 161 t/day.

The temperature measured within the furnace is 1 340° C. and the $H_2S/SO_2$ molar ratio at the tail gas analyser is 2. All the ammonia is removed.

Consequently, the implementation of the process according to the invention makes possible better removal of the ammonia and simultaneously control of the consumption of pure oxygen, since the latter is reduced by 17% between the case 2.1. and the case 2.2.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for the partial oxidation, in a Claus furnace, of at least one gas comprising hydrogen sulphide and ammonia, known as an ammonia-comprising gas, using at least one gas rich in oxygen consisting of air enriched in oxygen in a content of greater than about 25 molar %, in which said process comprises:

the residual ammonia content at the outlet of the Claus furnace is measured with a laser diode, this value is compared with the desired residual ammonia content, and the ratio of the flow rate of the gas rich in oxygen to the flow rate of the ammonia-comprising gas is modified as necessary, so as to obtain the desired residual ammonia content and to minimize the amount of the gas rich in oxygen required by the process.

2. The process according to claim 1, wherein said ratio of the flow rate of the gas rich in oxygen to the flow rate of the ammonia-comprising gas is modified, so as to obtain said desired residual ammonia content for a minimum flow rate of gas rich in oxygen.

3. The process according to claim 2, wherein a second gas comprising oxygen, known as gas less rich in oxygen, exhibiting an oxygen content lower than that of the gas rich in oxygen, is introduced into the Claus furnace.

4. The process according to claim 3, wherein the gases are injected into the Claus furnace via separate pipes.

5. The process according to claim 4, wherein the velocity vectors for injection into the furnace of the various gases are substantially parallel.

6. The process according to claim 5, wherein the gas rich in oxygen is surrounded by a stream of gas less rich in oxygen.

7. The process according to claim 4, wherein the gases injected into the Claus furnace are coaxial.

8. The process according to claim 7, wherein the injection of the various gases is carried out by means of a multitube burner, where the central tube permits the injection of the ammonia-comprising gas, the first intermediate tube surrounding the central tube permits the injection of the gas rich in oxygen, the second intermediate tube surrounding the first intermediate tube permits the injection of the gas less rich in oxygen and the outer tube makes possible the injection of a stream of sour gas.

9. The process according to claim 4, wherein the gas rich in oxygen is surrounded by the gas less rich in oxygen.

10. The process according to claim 3, wherein a stream of gas comprising hydrogen sulphide and not ammonia, known as sour gas, is injected into the furnace.

11. The process according to claim 10, wherein at least a portion of the stream of sour gas is injected into the furnace so that at least a portion of this stream surrounds the gas comprising oxygen.

12. The process according to claim 3, wherein a set of gases are mixed before being injected into the Claus furnace, wherein the set of gases comprise at least one member selected from the group consisting of:

a) the ammonia-comprising gas and the sour gas; and b) at least one gas rich in oxygen and the gas less rich in oxygen.

13. The process according to claim 12, wherein at least a portion of the stream of ammonia-comprising gas is surrounded by at least a portion of the gas comprising oxygen.

14. The process according to claim 3, wherein the gas rich in oxygen is surrounded by the gas less rich in oxygen.

15. The process according to claim 2, wherein the residual ammonia content is measured continuously.

16. The process according to claim 15, wherein the laser diode is placed on the main pipe of the process downstream of the Claus furnace.

17. The process according to claim 1, wherein the laser diode is placed on a pipe for withdrawal of gas from the process downstream of the Claus furnace.

18. The process according to claim 17, wherein the gases from the withdrawal pipe are reinjected into the main pipe of the process downstream of the Claus furnace.

19. The process according to claim 2, wherein the ratio of the flow rate of the gas rich in oxygen to the flow rate of the ammonia-comprising gas is manually modified.

20. The process according to claim 1, wherein the ratio of the flow rate of the gas rich in oxygen to the flow rate of the ammonia-comprising gas is modified by a regulation loop placed between the laser diode and a controller which directs the flow regulator for the gas rich in oxygen.

21. The process according to claim 1, wherein the gas rich in oxygen is connected to two sources of gas rich in oxygen: a primary source and a secondary source.

22. The process according to claim 21, wherein:

the flow rate of the gas resulting from the primary source is controlled by a calculator as a function of the signal (FF) which the calculator receives from the measurement of the flow rate of the ammonia-comprising gas entering the furnace, and the flow rate of gas rich in oxygen resulting from the secondary source is controlled by the calculator as a function of the signal (FB) which the latter receives from the measurement of the residual ammonia content at the outlet of the furnace.

23. The process according to claim 1, wherein the concentration of hydrogen sulphide in the gas comprising hydrogen sulphide and ammonia is between about 10 and about 90 molar %.

24. The process according to claim 23, wherein the concentration of ammonia in the gas comprising hydrogen sulphide and ammonia is between about 10 and about 60 molar %.

25. The process according to claim 1, wherein the gas rich in oxygen is air enriched in oxygen in a content of between about 40 and about 100 molar %.

* * * * *

UNITED STATES PATENT AND TRADEMARK OFFICE
CERTIFICATE OF CORRECTION

PATENT NO.         : 6,902,713 B1
APPLICATION NO. : 10/399527
DATED                 : June 7, 2005
INVENTOR(S)        : Manuel Binoist et al.

It is certified that error appears in the above-identified patent and that said Letters Patent is hereby corrected as shown below:

In Column 12, line 6, replace the word "in" with the words --up to--.
In Column 12, line 21, replace the phrase "of gas" with --of the gas--.
In Column 12, line 32, replace the phrase "by a stream" with --by the stream--.
In Column 12, line 42, replace the phrase "of the gas" with --of the stream of gas--.
In Column 12, line 46, replace the phrase "by the gas" with --by a stream of gas--.
In Column 13, line 9, delete the phrase "of the process downstream of the Claus furnace"
In Column 13, line 16, replace the phrase "laser diode" with --device for measuring the residual ammonia content--.
In Column 14, line 4, replace the phrase "of gas" with --of the gas--.

Signed and Sealed this

Fourth Day of September, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,902,713 B1 |
| APPLICATION NO. | : 10/399527 |
| DATED | : June 7, 2005 |
| INVENTOR(S) | : Manuel Binoist et al. |

It is certified that error appears in the above-identified patent and that said Letters Patent is hereby corrected as shown below:

In Column 12, line 6, replace the word "in" with the words --up to--.
In Column 12, line 21, replace the phrase "of gas" with --of the gas--.
In Column 12, line 32, replace the phrase "by a stream" with --by the stream--.
In Column 12, line 42, replace the phrase "of the gas" with --of the stream of gas--.
In Column 12, line 46, replace the phrase "by the gas" with --by a stream of gas--.
In Column 13, line 9, delete the phrase "of the process downstream of the Claus furnace"
In Column 13, line 16, replace the phrase "laser diode" with --device for measuring the residual ammonia content--.
In Column 14, line 4, replace the phrase "of gas" with --of the gas--.

Signed and Sealed this

Eleventh Day of September, 2007

JON W. DUDAS
*Director of the United States Patent and Trademark Office*